United States Patent
Chen et al.

(10) Patent No.: US 12,530,529 B2
(45) Date of Patent: Jan. 20, 2026

(54) DOMAIN-SPECIFIC NAMED ENTITY RECOGNITION VIA GRAPH NEURAL NETWORKS

(71) Applicants: Robert Bosch GmbH, Stuttgart (DE); The Texas A&M University System, College Station, TX (US)

(72) Inventors: Pei Chen, College Station, TX (US); Haibo Ding, Fremont, CA (US); Jun Araki, San Jose, CA (US); Ruihong Huang, College Station, TX (US)

(73) Assignee: Robert Bosch GmbH & The Texas A&M University System, Germany & College Station, TX (US)

( * ) Notice: Subject to any disclaimer, the term of this patent is extended or adjusted under 35 U.S.C. 154(b) by 605 days.

(21) Appl. No.: 17/877,543

(22) Filed: Jul. 29, 2022

(65) Prior Publication Data
US 2024/0037339 A1     Feb. 1, 2024

(51) Int. Cl.
G06F 40/295     (2020.01)
G06F 40/35     (2020.01)
G06N 3/04     (2023.01)

(52) U.S. Cl.
CPC ............ *G06F 40/295* (2020.01); *G06F 40/35* (2020.01); *G06N 3/04* (2013.01)

(58) Field of Classification Search
CPC ......... G06F 40/295; G06F 40/35; G06N 3/04; G06N 3/044; G06N 5/022
See application file for complete search history.

(56) References Cited

U.S. PATENT DOCUMENTS

| | | | |
|---|---|---|---|
| 2021/0034701 A1* | 2/2021 | Fei ........................ | G06N 3/044 |
| 2021/0118442 A1* | 4/2021 | Poddar .................. | H04L 51/224 |
| 2021/0209139 A1* | 7/2021 | Wu ........................ | G06N 3/006 |
| 2022/0245337 A1* | 8/2022 | Wu ........................ | G06N 5/022 |
| 2022/0351716 A1* | 11/2022 | Kim ....................... | G10L 25/30 |

OTHER PUBLICATIONS

Shi et al., "Multi-level semantic fusion network for Chinese medical named entity recognition", Jul. 22, 2022, Journal of Biomedical Informatics, vol. 133 (Year: 2022).*
Ji et al., "A deep neural network model for speakers coreference resolution in legal texts", Aug. 20, 2020, Information Processing and Management, vol. 57, Issue 6 (Year: 2020).*

(Continued)

*Primary Examiner* — Pierre Louis Desir
*Assistant Examiner* — Cody Douglas Hutcheson
(74) *Attorney, Agent, or Firm* — Dickinson Wright PLLC

(57) ABSTRACT

A computer-implemented method of Named Entity Recognition (NER) includes receiving an input, identifying a plurality of candidate entities corresponding to the input, assigning word embeddings to the input at an embedding layer, capturing sequential context of the word embeddings in an encoding layer to obtain encoded word embeddings, constructing an entity relation graph using global coreference relations and local dependency relations to obtain a coreference graph and a dependency graph, fusing the encoded word embeddings, coreference graph, and dependency graph, via a graphical neural network (GNN), to obtain updated word embeddings, and decoding the updated word embeddings via a decoding layer to obtain enriched entity predictions.

20 Claims, 5 Drawing Sheets

(56) References Cited

OTHER PUBLICATIONS

Soraluze et al., "EUSKOR: End-to-end coreference resolution system for Basque", 2019, PLoS One 14(9) (Year: 2019).*
Jie et al., "Efficient Dependency-Guided Named Entity Recognition", 2017, Proceedings of the Thirty-First AAAI Conference on Artificial Intelligence (Year: 2017).*
Lee et al. "Multiple Embeddings Enhanced Multi-Graph Neural Networks for Chinese Healthcare Named Entity Recognition", 2021, IEEE Journal of Biomedical and Health Informatics, vol. 25, No. 7 (Year: 2021).*
Sui et al., "Leverage Lexical Knowledge for Chinese Named Entity Recognition via Collaborative Graph Network", 2019, Proceedings of the 2019 Conference on Empirical Methods in Natural Language Processing and the 9th International Joint Conference on Natural Language Processing, pp. 3830-3840 (Year: 2019).*
Xiong et al. "Leveragin Multi-source knowledge for Chinese clinical named entity recognition via relational graph convolutional network", Feb. 23, 2022, Journal of Biomedical Informatics (Year: 2022).*
Alan Akbik et al., "Pooled Contextualized Embeddings for Named Entity Recognition," Proceedings of the 2019 Conference of the North American Chapter of the Association for Computational Linguistics: Human Language Technologies, Minneapolis, Minnesota, Jun. 2-Jun. 7, 2019, vol. 1, pp. 724-728.
Alan Akbik e al., "Contextual String Embeddings for Sequence Labeling," Proceedings of the 27th International Conference on Computational Linguistics, Santa Fe, New Mexico, USA, Aug. 20-26, 2018, pp. 1638-1649.
Giannis Bekoulis et al., "Joint entity recognition and relation extraction as a multi-head selection problem," Expert Systems With Applications 2018, vol. 114, pp. 34-45.
Iz Beltagy et al., "SCIBERT: A Pretrained Language Model for Scientific Text," Proceedings of the 2019 Conference on Empirical Methods in Natural Language Processing and the 9th International Joint Conference on Natural Language Processing, Hong Kong, China, Nov. 3-7, 2019, pp. 3615-3620.
Razvan C. Bunescu et al., "A Shortest Path Dependency Kernel for Relation Extraction," Proceedings of the Human Language TechnologyConference and Conference on Empirical Methods in Natural Language Processing Vancouver, B.C., Oct. 2005, pp. 724-731.
Zeyu Dai et al., "Coreference Aware Representation Learning for Neural Named Entity Recognition," Proceedings of the Twenty-Eighth International Joint Conference on Artificial Intelligence (IJCAI-19), pp. 4946-4953.
Jacob Devlin et al., "BERT: Pre-training of Deep Bidirectional Transformers for Language Understanding," Proceedings of NAACL-HLT 2019, Minneapolis, Minnesota, Jun. 2-Jun. 7, 2019, pp. 4171-4186.
Tao Gui et al., "Leveraging Document-Level Label Consistency for Named Entity Recognition," Proceedings of the Twenty-Ninth International Joint Conference on Artificial Intelligence (IJCAI-20), pp. 3976-3982.
Yufan Jiang et al., "Improved Differentiable Architecture Search for Language Modeling and Named Entity Recognition," Proceedings of the 2019 Conference on Empirical Methods in Natural Language Processing and the 9th International Joint Conference on Natural Language Processing, Hong Kong, China, Nov. 3-7, 2019, pp. 3585-3590.
John Lafferty et al., "Conditional Random Fields: Probabilistic Models for Segmenting and Labeling Sequence Data," ICML 2001, 8 Pages.
Jinhyuk Lee et al., "BioBERT: a pre-trained biomedical language representation model for biomedical text mining," Bioinformatics, 2020, vol. 36, No. 4, pp. 1234-1240.
Fei Li et al., "A neural joint model for entity and relation extraction from biomedical text," BMC Bioinformatics 2017, vol. 18, Article No. 198, pp. 1-11.
Xiaoya Li et al., "A Unified MRC Frameworkfor Named Entity Recognition," Proceedings of the 58th Annual Meeting of the Association for Computational Linguistics, Jul. 5-10, 2020, pp. 5849-5859.
Linmei Hu et al., "Heterogeneous Graph Attention Networks for Semi-supervised Short Text Classification," Proceedings of the 2019 Conference on Empirical Methods in Natural Language Processing and the 9th International Joint Conference on Natural Language Processing, Hong Kong, China, Nov. 3-7, 2019, pp. 4821-4830.
Yi Luan et al., "A General Framework for Information Extraction using Dynamic Span Graphs," Proceedings of NAACL-HLT 2019, Minneapolis, Minnesota, Jun. 2-Jun. 7, 2019, pp. 3036-3046.
Ying Luo et al., "Hierarchical Contextualized Representation for Named Entity Recognition," The Thirty-Fourth AAAI Conference on Artificial Intelligence (AAAI-20), pp. 8441-8448.
Xuezhe Ma et al., "End-to-end Sequence Labeling via Bi-directional LSTM-CNNs-CRF," Proceedings of the 54th Annual Meeting of the Association for Computational Linguistics, Berlin, Germany, Aug. 7-12, 2016, pp. 1064-1074.
Makoto Miwa et al., "End-to-End Relation Extraction using LSTMs on Sequences and Tree Structures," Proceedings of the 54th Annual Meeting of the Association for Computational Linguistics, Berlin, Germany, Aug. 7-12, 2016, pp. 1105-1116.
Sampo Pyysalo et al., "Anatomical entity mention recognition at literature scale," Bioinformatics 2014, vol. 30, No. 6, pp. 868-875.
Yujie Qian et al., "GraphIE: A Graph-Based Framework for Information Extraction," Proceedings of NAACL-HLT 2019, Minneapolis, Minnesota, Jun. 2-Jun. 7, 2019, pp. 751-761.
Dianbo Sui et al., "Leverage Lexical Knowledge for Chinese Named Entity Recognition via Collaborative Graph Network," Proceedings of the 2019 Conference on Empirical Methods in Natural Language Processing and the 9th International Joint Conference on Natural Language Processing, Hong Kong, China, Nov. 3-7, 2019, pp. 3830-3840.
Dianbo Sui et al., "Joint Entity and Relation Extraction with Set Prediction Networks," arXiv:2011.01675v2 [cs.CL] Nov. 5, 2020, 10 Pages.
Petar Veličković et al., "Graph Attention Networks," Learning Representations, ICLR 2018, Vancouver, BC, Canada, Apr. 30-May 3, 2018, Conference Track Proceedings, 12 Pages.
Kiri L.Wagstaff et al., "Mars Target Encyclopedia: Rock and Soil Composition Extracted from the Literature," The Thirtieth AAAI Conference on Innovative Applications of Artificial Intelligence (IAAI-18), pp. 7861-7866.
Zihan Wang et al., "CrossWeigh: Training Named Entity Tagger from Imperfect Annotations," Proceedings of the 2019 Conference on Empirical Methods in Natural Language Processing and the 9th International Joint Conference on Natural Language Processing, Hong Kong, China, Nov. 3-7, 2019, pp. 5154-5163.
Jie Yang et al., "NCRF++: An Open-source Neural Sequence Labeling Toolkit," Proceedings of the 56th Annual Meeting of the Association for Computational Linguistics-System Demonstrations, Melbourne, Australia, Jul. 15-20, 2018, pp. 74-79.
Yue Yuan et al., "A Relation-Specific Attention Network for Joint Entity and Relation Extraction," Proceedings of the Twenty-Ninth International Joint Conference on Artificial Intelligence (IJCAI-20), pp. 4054-4060.
Yuhao Zhang et al., "Graph Convolution over Pruned Dependency Trees Improves Relation Extraction," Proceedings of the 2018 Conference on Empirical Methods in Natural Language Processing, Brussels, Belgium, Oct. 31-Nov. 4, 2018, pp. 2205-2215.

* cited by examiner

DOMAIN-SPECIFIC NAMED ENTITY RECOGNITION VIA GRAPH NEURAL NETWORKS

STATEMENT REGARDING FEDERALLY SPONSORED RESEARCH

This invention was made with government support under grant number NSF IIS-1909255 51408000001, awarded by the National Science Foundation. The government may have certain rights to this invention.

TECHNICAL FIELD

The present disclosure relates to named entity recognition (NER). Specifically connecting entity mentions based on both global coreference relations and local dependency relations.

BACKGROUND

Named Entity Recognition (NER) involves the identification of key information in spoken dialogue or text and classifies it into a set of predefined categories. The entity is the object that is talked about or refer to in the text. NER is a form of Natural Language Processing (NLP). NLP can be broken down into a two-step process, first detecting the entities from the speech or text, and second classifying the entities into categories. The categories may include persons, places, things, organizations, time, expressions, numerical measurements (e.g., item quantity, money, percentage, weight, etc). NER is applicable to a variety of applications, including question answering, information retrieval, and machine translation. NER can also be used to improve the accuracy of other NLP tasks, such as part-of-speech tagging and parsing.

A spoken dialogue system is a human-computer interaction system that tries to understand utterances or words spoken by a user and respond to the user effectively. Such dialogue systems have a wide range of applications, such as information searching (e.g., searching weather, flight schedules, train schedules, etc.) traveling, ticket reservation, food ordering, and the like. At-home assistants (e.g., AMAZON ECHO and APPLE HOMEPOD) integrate a dialogue system that receives spoken utterances from a user and, in turn, attempts to provide an accurate response. A chatbot is one example of a utilization of a dialogue system. A chatbot is an artificial intelligence (AI)-based application that can imitate a conversation with users in their natural language. A chatbot can react to user's requests and, in turn, deliver a particular service.

SUMMARY

A computer-implemented method of operating a dialogue system, the computer-implemented method includes, at a chatbot, receiving an input, identifying a plurality of candidate entities corresponding to the input, assigning word embeddings to the input at an embedding layer, capturing sequential context of the word embeddings in an encoding layer to obtain encoded word embeddings, constructing an entity relation graph using global coreference relations and local dependency relations to obtain a coreference graph and a dependency graph, fusing the encoded word embeddings, coreference graph, and dependency graph to obtain updated word embeddings, decoding the updated word embeddings via a decoding layer to obtain enriched entity predictions, and operating the dialogue system based on enriched entity predictions.

A system for operating a chatbot in a dialogue setting, the system includes a human-machine interface (HMI) configured to receive input from a user and provide output to the user, one or more storage devices, and one or more processors in communication with the HMI and the one or more storage devices. The one or more processors programmed to, at a chatbot, receive an input, identify a plurality of candidate entities corresponding to the input, assign word embeddings to the input at an embedding layer, capture sequential context of the word embeddings in an encoding layer to obtain encoded word embeddings, construct an entity relation graph using global coreference relations and local dependency relations to obtain a coreference graph and a dependency graph, fuse the encoded word embeddings, coreference graph, and dependency graph to obtain updated word embeddings, decode the updated word embeddings via a decoding layer to obtain enriched entity predictions, and operate the dialogue system based on enriched entity predictions.

A computer-implemented method of Named Entity Recognition (NER) includes receiving an input, identifying a plurality of candidate entities corresponding to the input, assigning word embeddings to the input at an embedding layer, capturing sequential context of the word embeddings in an encoding layer to obtain encoded word embeddings, constructing an entity relation graph using global coreference relations and local dependency relations to obtain a coreference graph and a dependency graph, fusing the encoded word embeddings, coreference graph, and dependency graph, via a graphical neural network (GNN), to obtain updated word embeddings, and decoding the updated word embeddings via a decoding layer to obtain enriched entity predictions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Named-entity recognition (NER) is a mechanism in which automated processing (e.g., computer-based processing) is applied to unstructured text in order to identify and categorize occurrences of "named entities" (e.g., people, businesses, locations, etc.) in the unstructured text. For example, in some implementations, NER is a machine-learning-based natural language processing mechanism in which unstructured natural-language sentences are provided as input to a machine-learning model and the output of the machine-learning model includes an indication of an assigned category for each "entity" (or potential entity) in the sentence (e.g., words or phrases that appear in the sentence that the machine-learning model determines may correspond to proper names, objects, etc.). For example, if the input sentence provided to as input recites: "John is travelling to London," the output of a trained NER machine-learning model may indicate the "John" is categorized as a "person" and "London" is categorized as a "location."

Figure 1:
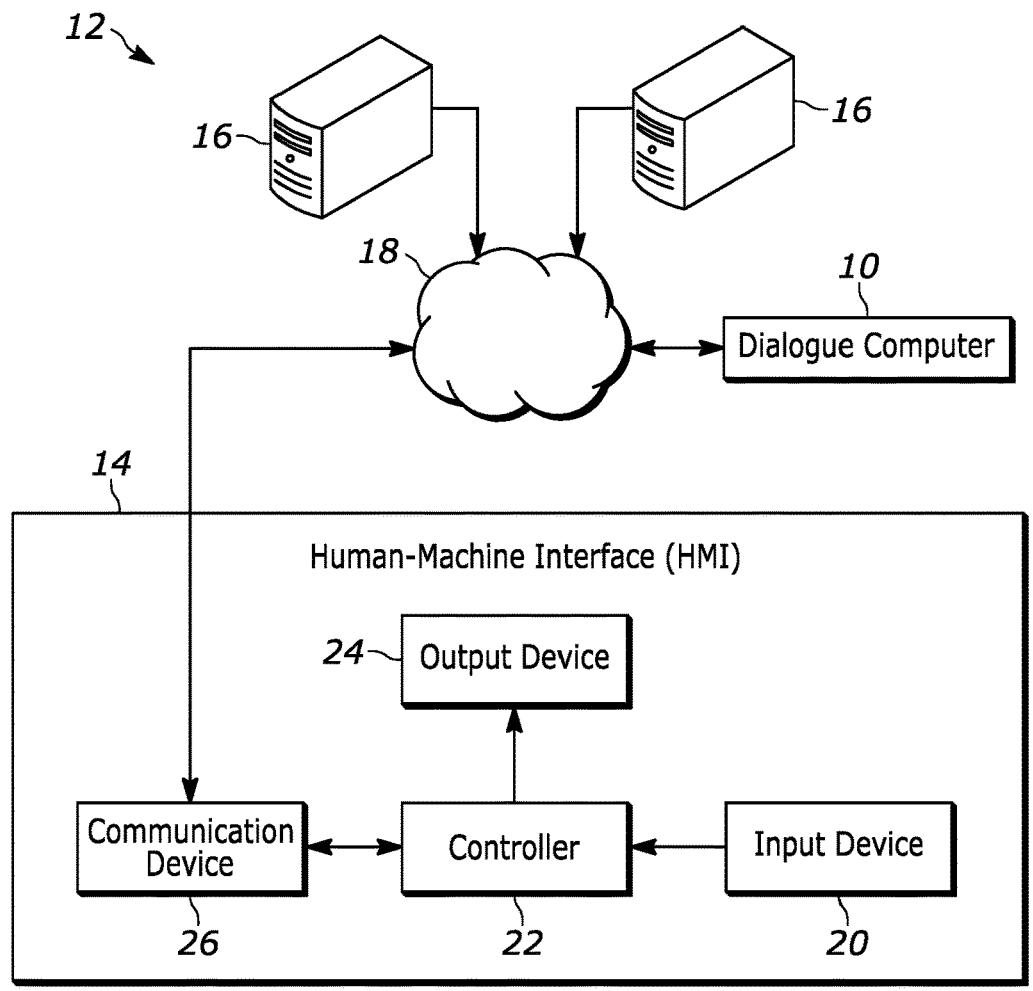
FIG. 1 is a schematic diagram of an example of a dialogue system that includes a human-machine interface (HMI) and a dialogue computer, according to one embodiment.

Turning now to the figures, wherein like reference numerals indicate like or similar features and/or functions, a dialogue computer 10 is shown for generating an answer to a query or question posed by a user (not shown). According to an example, FIG. 1 illustrates a question and answer (Q&A) system, also referred to as a chatbot system or dialogue system 12 that comprises a human-machine interface (HMI) 14 for the user, one or more storage media devices 16 (two are shown by way of example only), the dialogue computer 10, and a communication network 18 that may facilitate data communication between the HMI 14, the storage media devices 16, and the dialogue computer 10. As will be explained in detail below, the user may provide his/her query via text, speech, or the like using HMI 14, and the query may be transmitted to dialogue computer 10 (e.g., via communication network 18). Upon receipt, the dialogue computer 10 may utilize the dialogue system 12 disclosed herein. Using the dialogue system 12 disclosed herein improves question and answer accuracy, and provides more natural responses from the dialogue computer 10. The dialogue computer 10 described herein improves the user experience; for example, by providing more accurate responses to user queries and recalling information from the conversation history, users are less likely to become frustrated with a system that provides a computer-generated response.

A user of the dialogue system 12 may be a human being which communicates a query (i.e., a question) with a desire to receive a corresponding response. According to one embodiment, the query may regard any suitable subject matter. In other embodiments, the query may pertain to a predefined category of information (e.g., customer technical support for a product or service, ordering food, etc.). These are merely examples; other embodiments also exist and are contemplated herein. An example process of providing an answer to the user's query will be described following a description of illustrative elements of dialogue system 12.

Human-machine interface (HMI) 14 may comprise any suitable electronic input-output device which is capable of: receiving a query from a user, communicating with dialogue computer 10 in response to the query, receiving an answer from dialogue computer 10, and in response, providing the answer to the user. According to the illustrated example of FIG. 1, the HMI 14 may comprise an input device 20, a controller 22, an output device 24, and a communication device 26. The HMI 14 may be, for example, an electronic personal assistant (e.g., an ECHO by AMAZON, HOMEPOD by APPLE, etc.) or a digital personal assistant (e.g., ALEXA by AMAZON, CORTANA by MICROSOFT, SIRI by APPLE, etc.) on a mobile device. In other embodiments, the HMI 14 may be an internet web browser configured to communicate information back and forth between the user and the service provider. For example, the HMI 14 may be embodied on a website for a general store, restaurant, hardware store, etc.

The input device 20 may comprise one or more electronic input components for receiving a query from the user. Non-limiting examples of input components include: a microphone, a keyboard, a camera or sensor, an electronic touch screen, switches, knobs, or other hand-operated controls, and the like. Thus, via the input device 20, the HMI 14 may receive the query from user via any suitable communication format—e.g., in the form of typed text, uttered speech, user-selected symbols, image data (e.g., camera or video data), sign-language, a combination thereof, or the like. Further, the query may be received in any suitable language. As used herein, the term utterance is intended to mean spoken speech as well as written (e.g., typed) speech of a user.

The controller 22 may be any electronic control circuit configured to interact with and/or control the input device 20, the output device 24, and/or the communication device 26. Controller 22 may comprise a microprocessor, a field-programmable gate array (FPGA), or the like; however, in some examples only discrete circuit elements are used. According to an example, the controller 22 may utilize any suitable software as well (e.g., non-limiting examples include: DialogFlow™, a Microsoft chatbot framework, and Cognigy™). While not shown here, in some implementations, the dialogue computer 10 may communicate directly with the controller 22. Further, in at least one example, the controller 22 may be programmed with software instructions that comprise—in response to receiving at least some image data—determining user gestures and reading the user's lips. The controller 22 may provide the query to the dialogue computer 10 via the communication device 26. In some instances, the controller 22 may extract portions of the query and provide these portions to the dialogue computer 10—e.g., controller 22 may extract a subject of the sentence, a predicate of the sentence, an action of the sentence, a direct object of the sentence, etc.

The output device 24 may comprise one or more electronic output components for presenting an answer to the user, wherein the answer corresponds with a query received via the input device 20. Non-limiting examples of output components include: a loudspeaker, an electronic display (e.g., screen, touchscreen), or the like. In this manner, when the dialogue computer 10 provides an answer to the query, the HMI 14 may use the output device 24 to present the answer to the user according to any suitable format. Non-limiting examples include presenting the user with the answer in the form of audible speech, displayed text, one or more symbol images, a sign language video clip, or a combination thereof.

The communication device 26 may comprise any electronic hardware necessary to facilitate communication between dialogue computer 10 and at least one of controller 22, input device 20, or output device 24. Non-limiting examples of the communication device 26 include: a router, a modem, a cellular chipset, a satellite chipset, a short-range wireless chipset (e.g., facilitating Wi-Fi, Bluetooth, dedicated short-range communication (DSRC) or the like), or a combination thereof. In at least one example, the communication device 26 is optional. For example, the dialogue computer 10 could communicate directly with the controller 22, the input device 20, and/or the output device 24.

The storage media devices 16 may be any suitable writable and/or non-writable storage media communicatively coupled to the dialogue computer 10. While two are shown in FIG. 1, more or fewer may be used in other embodiments. According to at least one example, the hardware of each storage media device 16 may be similar or identical to one another; however, this is not required. According to an example, storage media device(s) 16 may be (or form part of) a database, a computer server, a push or pull notification server, or the like. In at least one example, storage media device(s) 16 comprise non-volatile memory; however, in other examples, they may comprise volatile memory instead of or in combination with non-volatile memory. Storage media device(s) 16 (or other computer hardware associated with devices 16) may be configured to provide data to dialogue computer 10 (e.g., via communication network 18). Also, as will be described herein, the storage media device(s) 16 may be configured to store conversation history for recall during a chat session. For example, if a slot-filling system is activated, the conversation history between the human and the dialogue computer 10 may be stored in the media device(s) 16, whereupon the dialogue computer 10 can recall part of the conversation history to see if a slot-filling answer was provided by the user based on context of the conversation. The data provided by storage media device(s) 16 may enable the operation of chatbots using structured data, unstructured data, or a combination thereof; however, in at least one embodiment, each storage media device 16 stores and/or communicates some type of unstructured data to dialogue computer 10.

Structured data may be data that is labeled and/or organized by field within an electronic record or electronic file. The structured data may include one or more knowledge graphs (e.g., having a plurality of nodes (each node defining a different subject matter domain), wherein some of the nodes are interconnected by at least one relation), a data array (an array of elements in a specific order), metadata (e.g., having a resource name, a resource description, a unique identifier, an author, and the like), a linked list (a linear collection of nodes of any type, wherein the nodes have a value and also may point to another node in the list), a tuple (an aggregate data structure), and an object (a structure that has fields and methods which operate on the data within the fields). In short, the structured data may be broken into classifications, where each classification of data may be assigned to a particular chatbot. For example, as will be described further herein, a "food" chatbot may include data enabling the system to respond to a user's query with information about food, while a "drinks" chatbot may include data enabling the system to respond to the user's query with information about drinks. Each master chatbot and assistant chatbot disclosed herein may be in structured data stored in storage media device 16, or in the dialogue computer 10 in memory 32 and/or 34 and accessed and processed by processor 30.

The structured data may include one or more knowledge types. Non-limiting examples include: a declarative commonsense knowledge type (scope comprising factual knowledge; e.g., "the sky is blue," "Paris is in France," etc.); a taxonomic knowledge type (scope comprising classification; e.g., football players are athletes," "cats are mammals," etc.); a relational knowledge type (e.g., scope comprising relationships; e.g., "the nose is part of the head," "handwriting requires a hand and a writing instrument," etc.); a procedural knowledge type (scope comprising prescriptive knowledge, a.k.a., order of operations; e.g., "one needs an oven before baking cakes," "the electricity should be disconnected while the switch is being repaired," etc.); a sentiment knowledge type (scope comprising human sentiments; e.g., "rushing to the hospital makes people worried," "being on vacation makes people relaxed," etc.); and a metaphorical knowledge type (scope comprising idiomatic structures; e.g., "time flies," "it's raining cats and dogs," etc.).

Unstructured data may be information that is not organized in a pre-defined manner (i.e., which is not structured data). Non-limiting examples of unstructured data include text data, electronic mail (e-mail) data, social media data, internet forum data, image data, mobile device data, communication data, and media data, just to name a few. Text data may comprise word processing files, spreadsheet files, presentation files, message field information of e-mail files, data logs, etc. Electronic mail (e-mail) data may comprise any unstructured data of e-mail (e.g., a body of an e-mail message). Social media data may comprise information from commercial websites such as Facebook™, Twitter™, LinkedIn™, etc. Internet forum data (e.g., also called message board data) may comprise online discussion information (of a website) wherein the website presents saved written communications of forum users (these written communications may be organized or curated by topic); in some examples, forum data may comprise a question and one or more public answers (e.g., question and answer (Q&A) data). Of course, Q&A data may form parts of other data types as well. Image data may comprise information from commercial websites such as YouTube™, Instagram™, other photo-sharing sites, and the like. Mobile device data may comprise Short Message System (SMS) or other short message data, mobile device location data, etc. Communication data may comprise chat data, instant message data, phone recording data, collaborative software data, conversation history saved as part of the slot-filling system disclosed herein, etc. And media data may comprise Motion Pictures Expert Group (MPEG) Audio Layer IIIs (MP3s), digital photos, audio files, video files (e.g., including video clips (e.g., a series of one or more frames of a video file)), etc.; and some media data may overlap with image data. These are merely examples of unstructured data; other examples also exist. Further, these and other suitable types of unstructured data may be received by the dialogue computer 10—receipt may occur concurrently or otherwise.

Figure 2:
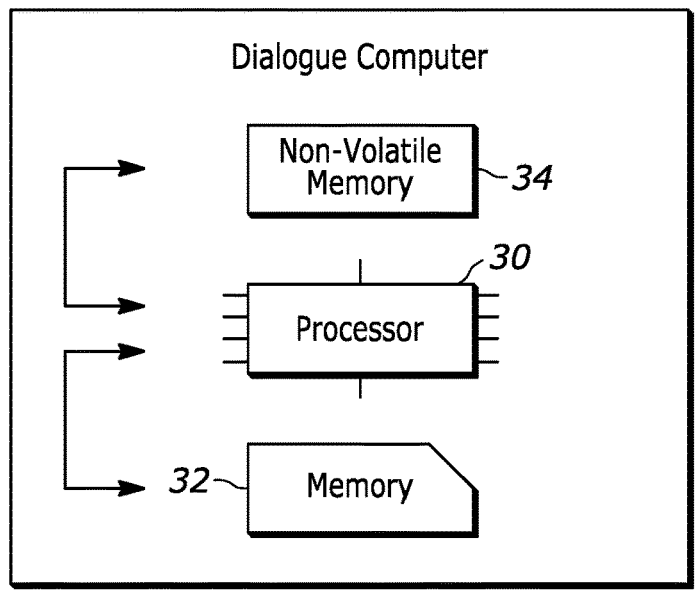
FIG. 2 is a schematic diagram of an embodiment of the dialogue computer.

As shown in FIGS. 1 and 2, the dialogue computer 10 may be any suitable computing device that is programmed or otherwise configured to receive a query from the input device 20 (e.g., from HMI 14) and provide an answer using a neural network or machine learning that employs a language model. The dialogue system 12 may comprise any suitable computing components. According to an example, dialogue computer 10 comprises one or more processors 30 (only one is shown in the diagram for purposes of illustration), memory 32 that may store data received from the user and/or the storage media devices 16, and non-volatile memory 34 that may store data and/or a plurality of instructions executable by processor(s) 30.

Processor(s) 30 may be programmed to process and/or execute digital instructions to carry out at least some of the tasks described herein. Non-limiting examples of processor(s) 30 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 30 read from memory 32 and/or non-volatile memory 34 and execute multiple sets of instructions which may be embodied as a computer program product stored on a non-transitory computer-readable storage medium (e.g., such as in non-volatile memory 34). Some non-limiting examples of instructions are described in the process(es) below and illustrated in the drawings. These and other instructions may be executed in any suitable sequence unless otherwise stated. The instructions and the example processes described below are merely embodiments and are not intended to be limiting.

Memory 32 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 32 may store one or more sets of instructions which may be embodied as software, firmware, or other suitable programming instructions executable by the processor(s) 30—including but not limited to the instruction examples set forth herein. In operation, processor(s) 30 may read data from and/or write data to memory 32. Instructions executable by the processor(s) 30 may include instructions to receive an input (e.g., utterance or typed language), utilize a language model to unpack the input and determine what is the intent of the user or input, determine whether the intent requires slots to be filled, determine whether the input provides suitable data to fill those slots, query the user to provide slot-filling answers to fill any unfilled slots, determine an intent of the input received in response to the query, determine if the intent of the input received in response to the query has a slot-filling intent, determining whether additional input provides slot-filling answers based on stored conversation history, and providing responsive outputs to the user, as will be described more fully herein.

Non-volatile memory 34 may comprise ROM, EPROM, EEPROM, CD-ROM, DVD, and other suitable non-volatile memory devices. Further, as memory 32 may comprise both volatile and non-volatile memory devices, in at least one example additional non-volatile memory 34 may be optional.

While FIG. 1 illustrates an example of the HMI 14 that does not comprise the dialogue computer 10, in other embodiments the dialogue computer 10 may be part of the HMI 14 as well. In these examples, having dialogue computer local to and even sometimes within a common housing of the HMI 14 enables portable implementations of the dialogue system 12.

Communication network 18 facilitates electronic communication between dialogue computer 10, the storage media device(s) 16, and HMI 14. Communication network 18 may comprise a land network, a wireless network, or a combination thereof. For example, the land network may enable connectivity to public switched telephone network (PSTN) such as that used to provide hardwired telephony, packet-switched data communications, internet infrastructure, and the like. And for example, the wireless network may comprise cellular and/or satellite communication architecture covering potentially a wide geographic region. Thus, at least one example of a wireless communication network may comprise eNodeBs, serving gateways, base station transceivers, and the like.

Figure 3:
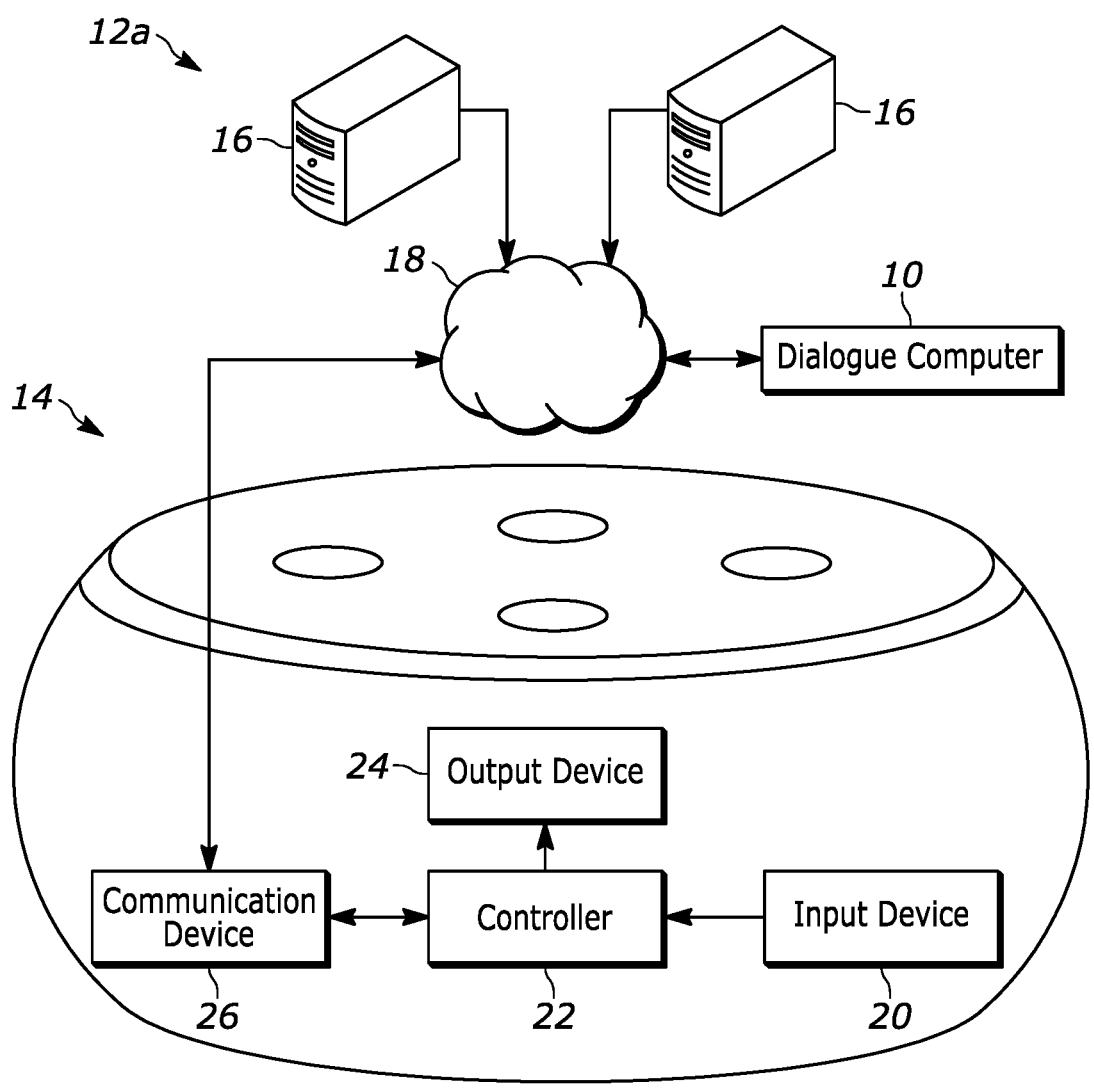
FIG. 3 is a schematic diagram of an embodiment of the dialogue system wherein the HMI is an electronic personal assistant.

FIG. 3 illustrates one embodiment of a dialogue system 12a (e.g., Q&A system). According to the illustrated embodiment, the dialogue system 12a includes an HMI 14 that is an electronic personal assistant, such as one of the ones described above that includes the input device the controller 22, the output device 24, and the communication device 26. The HMI 14 may be configured to receive any request from the user via input device 20, determine an intent of the request, determine if the request requires any slots to be filled, communicate with storage 16 and/or memory 32/34 to store conversation history, and determine if the intent of the request or any subsequent input from the user includes slot-filling information based on the stored conversation history.

Named entity recognition (NER) is well studied for the general domain, and recent systems have achieved human-level performance for identifying common entity types. However, the NER performance is still moderate for specialized domains that tend to feature complicated contexts and jargonistic entity types. To address these challenges, this disclosure presents explicitly connecting entity mentions based on both global coreference relations and local dependency relations for building better entity mention representations. Supported by experiments, this disclosure incorporates entity mention relations by Graph Neural Networks and shows that this system noticeably improves the NER performance on two datasets from different domains. Along with illustrating that the proposed system can effectively elevate the NER performance to a higher level even when only a tiny amount of labeled data is available, which is desirable for domain-specific NER.

Named entity recognition (NER) has been well studied for the general domain, and recent systems have achieved close to human-level performance for identifying a small number of common NER types, such as Person and Organization, mainly benefiting from the use of Neural Network models and pretrained Language Models (LMs). However, the performance is still moderate for specialized domains that tend to feature diverse and complicated contexts as well as a richer set of semantically related entity types (e.g., Cell, Tissue, Organ etc. for the biomedical domain). With these challenges in view, this disclosure presents that being aware of the re-occurrences of the same entity as well as semantically related entities will lead to better NER performance for specific domains.

Figure 4:
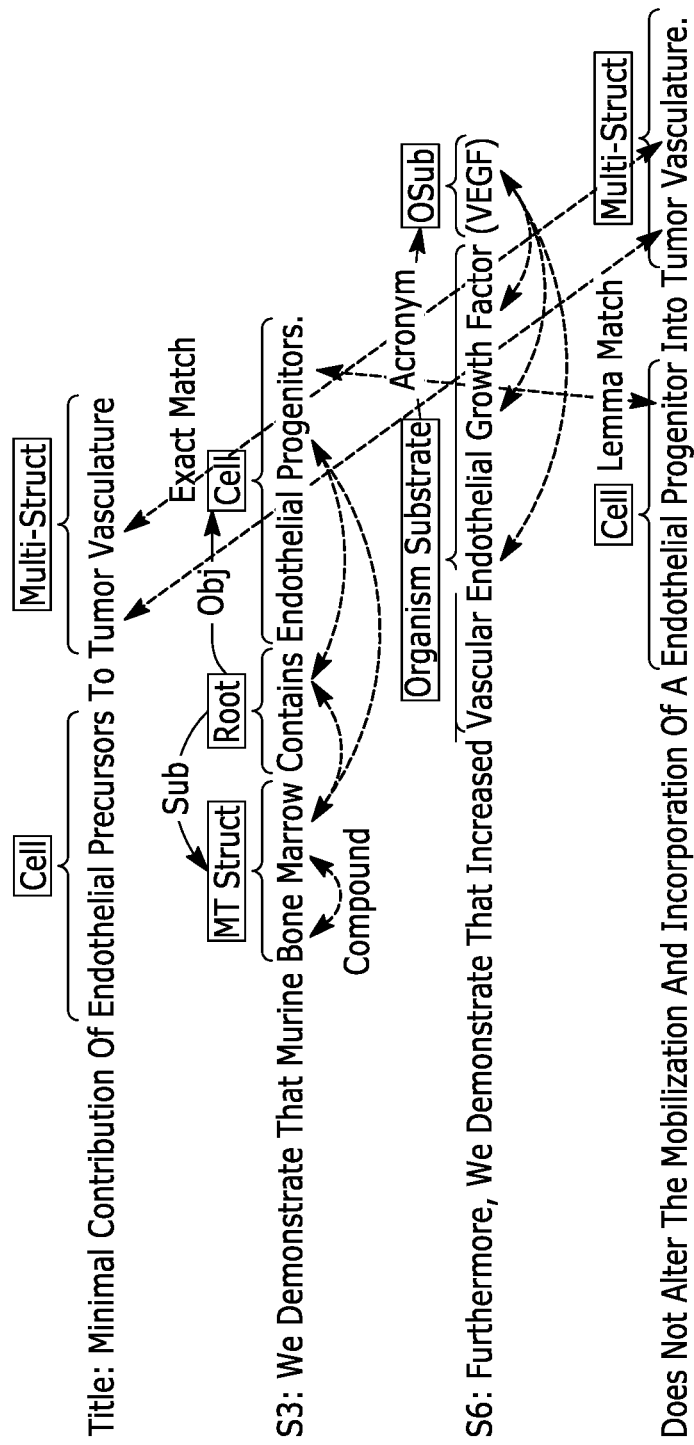
FIG. 4 illustrates an example of NER with both discourse-level and sentence-level entity relations.

Therefore, this disclosure presents explicitly connecting entity mentions in a document that are coreferential or in a tight semantic relation to better learn entity mention representations. Precisely, as shown in FIG. 4, first connect repeated mentions of the same entity even if they are sentences away. For example, the named entity "tumor vasculature" appears both in the Title and sentence S6 but in quite different contexts. Connecting the repeated mentions in a document enables the integration of contextual cues as well as enables consistent predictions of their entity types.

Second, connect entity mentions based on sentence-level dependency relations to effectively identify semantically related entities. For example, the two entities in sentence S3, "bone marrow" of the type Multi-tissue Structure and "endothelial progenitors" of the type Cell, are the subject and object of the predicate "contains" respectively in the dependency tree. If the system can reliably predict the type of one entity, we can infer the type of the other entity more easily, knowing that they are closely related on the dependency tree.

Then incorporate both relations by using Graph Neural Networks (GNNs), specifically, use the Graph Attention Networks (GATs) that have been shown effective for a range of tasks. Empirical results show that this method can learn better word representations for sequence tagging models and further improve the NER performance over strong LMs-based baselines on two datasets, the AnatEM dataset from the biomedical domain and the Mars dataset from the planetary science domain. In addition, considering the lack of annotations challenge for domain-specific NER, plot learning curves and show that leveraging relations between entity mentions can effectively and consistently improve the NER performance when limited annotations are available.

Related Work

NER research has a long history and recent approaches using Neural Network models like BiLSTM-CNN-CRF and contextual embeddings such as BERT and FLAIR have improved the NER performance in the general domain to the human-level. However, the NER performance for specific domains is still moderate due to the challenges of limited annotations and dealing with complicated domain-specific contexts.

This disclosure presents an aim to further improve NER performance by considering coreference relations and semantic relations between entity mentions. This is in contrast to the usual way of thinking about NER as an up-stream task conducted before coreference resolution or entity relation extraction. The idea aligns with recent works that conduct joint inferences among multiple information extraction tasks, including NER, coreference resolution and relation extraction, by mining dependencies among the extractions. However, joint inference approaches require annotations for all the target tasks and aim to improve performance for all the tasks as well, while our lightweight approach aims to improve the performance of the basic NER task requiring no additional annotations (usually unavailable for specific domains).

This new approach is also related to several recent neural approaches for NER that encourage label dependencies among entity mentions. The Pooled FLAIR model proposed a global pooling mechanism to learn word representations. Other approaches include a coreference layer with a regularizer to harmonize word representations. Another approach used graph neural nets to capture repetitions of the same word as well, but in a denser graph that includes edges between adjacent words and is meant to completely overlay the lower encoding layers. Memory networks were also used to store and refine predictions of a base model by considering repetitions or co-occurrences of words. In addition, dependency relations have been commonly used to connect entities for entity relation extraction, but this disclosure aims to better infer the type of an entity by associating it with other closely related entities in a sentence.

Model Architecture

Figure 5:
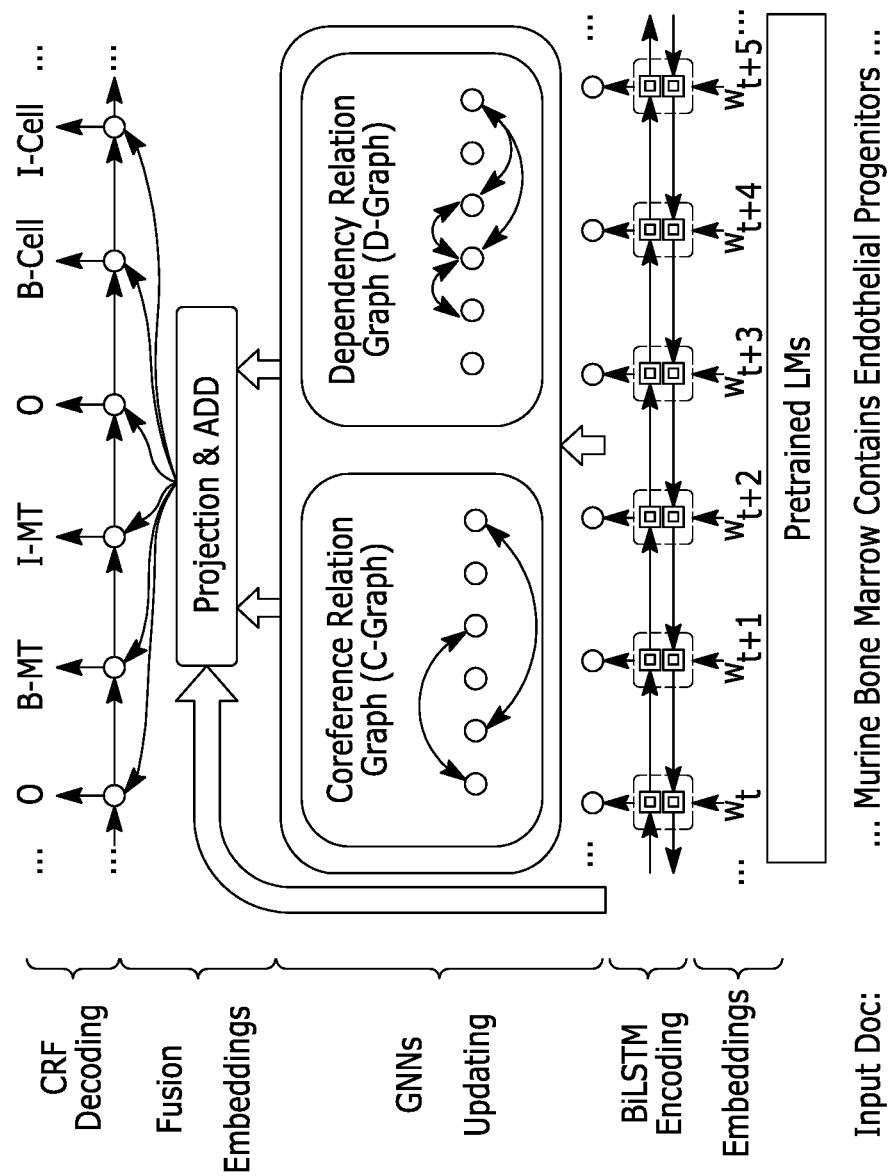
FIG. 5 is a block diagram of this Entity Relation Graphs (EnRel-G) system architecture.

This system with Entity Relation Graphs (EnRelG) mainly contains 5 layers as in FIG. 5: an embedding layer, an encoding layer, a GNNs layer, a fusion layer, and a decoding layer.

Embedding Layer: as an exemplary choice, consider the BERT-base LM as the embedding layer. For domain-specific datasets, consider using BioBERT for the biomedical domain and SciBERT for the planetary science domain. Specifically, for an input document D=[w1, w2, . . . , wn] with n words, the BERT model will output the contextual word embeddings matrix E=[w1, w2, . . . , wn]∈Rn×d1 with a d1 dimension vector for each word.

Encoding Layer: To capture the sequential context information, consider a BiLSTM layer to encode the word embeddings from the BERT model. Then concatenate the forward and backward Long Short-Term Memory (LSTM) hidden states as the encoded representations and then obtain embedding matrix Elstm=BiLSTM(E)∈Rn×d2 with a d2 dimension vector for each word.

Graph Neural Networks Layer: For the GNNs layer, first introduce how to build Entity Relation Graphs using global coreference relations (coreference graph, C-graph) and local dependency relations (dependency graph, D-graph) between entities, and then describe how the GNNs model incorporates them into the word representations.

Coreference Relation Graph: For each document, build a graph GC=(V, AC) based on coreference relations, in which V is a set of nodes denoting all the words in a document and AC is the adjacency matrix. Specifically, approximate the entity coreference relations using 3 syntactic coreference clues as in FIG. 4: (1) Exact Match, two nouns are connected if they are the same, e.g., "tumor vasculature" in both the Title and S6; (2) Lemma Match, two nouns are linked together if they have the same lemma, e.g., "progenitors" and "progenitor" in the S3 and S6; (3) Acronym Match, the acronym word is connected to all full expression words, e.g., "VEGF" and "vascular endothelial growth factor" in the S6. For each connected node pair (i, j), we set ACi, j=1. Also add a self-connection to each node (ACi, i=1) to maintain the words' original semantic information.

Dependency Relation Graph: Build a Dependency Relation Graphs GD=(V, AD) for each document based on sentence-level dependency relations. First parse each sentence using the scispaCy tool and then connect the following word pairs in the dependency tree: (1) subject head word & object head word & their predicate, then connect them to enhance the interactions between the entities from the subject and object. e.g., "marrow" and "progenitors" with the predicate "contains" in the S3; (2) compound & head word, and connect the compounds with their head words because they often both exist in an entity. e.g., the "bone" and "marrow" in the S3. Same as before, Set ADi, j=1 for each connect pair (i, j), and also add self-connection (ADi, i=1) for each node.

Then update the encoded word embeddings with the entity relations graphs based on GNNs, particularly the GATs. Since nodes represent the words in a document, initialize the node representations in the graphs from the encoding layer as $E^{lstm}=[w_1^{lstm}, w_2^{lstm}, \ldots, w_n^{lstm}]$. The graph attention mechanism updates the initial representation of node wilstm to wignn by aggregating its neighbors' representations with their corresponding normalized attention scores.

$$w_i^{gnn} = \|_{k=1}^{K} \sigma\left(\sum_{j \in N_i} \alpha_{ij}^k W^k w_j^{lstm}\right) \quad (1)$$

As in equation (1), and this has K heads of the attentions mechanism and concatenate (k) them as the final representation. For head k, weight all the adjacent nodes (Ni, obtained from the adjacent matrix A) by Wk and then aggregate them with the attention score αijk. σ is the activation function LeakyReLU. The attention score αijk is obtained as followed (aT is a weight vector):

$$\alpha_{ij}^k = \frac{\exp\left(\sigma(a^T(W^k w_i^{lstm} \| W^k w_j^{lstm}))\right)}{\sum_{z \in N_i} \exp\left(\sigma(a^T(W^k w_i^{lstm} \| W^k w_z^{lstm}))\right)} \quad (2)$$

For each of the two relation graphs, use an independent graph attention layer. The output word representations from the two GATs are denoted as:

$$G^C = [w_1^{gnn(C)}, w_2^{gnn(C)}, \ldots, w_2^{gnn(C)}] \in \mathbb{R}^{n \times d_3} \text{ and}$$

$$G^D = [w_1^{gnn(D)}, w_2^{gnn(D)}, \ldots, w_2^{gnn(D)}] \in \mathbb{R}^{n \times d_3}$$

with $d_3$ dimension for each word.

Fusion Layer: use a fusion layer to blend the encoded word embeddings and the GNNs updated word embeddings as in F=WNElstm+WCGC+WDGD∈ Rn×d4, where WN, WC, WD are trainable weights.

Decoding Layer: Finally, a Conditional Random Field (CRF) layer is used to decode the enriched embeddings F=[f1, f2, . . . , fn] into a sequence of labels y={y1, y2, . . . , yn}. Wherein the sequence of labels are an enriched entity predictions of the input. In the training phrase, then optimize the whole model by minimizing the negative log-likelihood loss with respect to golden labels.

Experiments

This model was tested on two domain-specific datasets: the AnatEM from the biomedical domain and the Mars from the planetary science domain. The AnatEM has annotated 12 types of entities in 1,212 documents with 13,701 entity mentions; the Mars has 117 longer documents with 4,458 entity mentions containing 3 types.

Baselines

NCRF++ is an opensource Neural Sequence Labelling Toolkit. Consider the use of the BiLSTM-CNN-CRF structure as a baseline. FLAIR is a character-level pretrained LM based on BiLSTM, which has been used in many NER systems. Also consider use the embeddings from it with a BiLSTM-CRF architecture as a baseline. Pooled FLAIR is an extended version of the FLAIR model with global memory and pooling mechanism for the same word, which helps consistent predictions of coreferential entity mentions. Also use the embeddings from it with a BiLSTM-CRF architecture as a baseline. Tuning Bio/SciBERT BERT is the embedding layer of our method, with Bio/SciBERT for the AnatEM/Mars dataset. And use it with a BiLSTM-CRF layer as a baseline.

Results

To alleviate random turbulence, consider training all the systems five times using different random seeds and evaluate their average performance on the test sets using the same script, as in the Table 1.

TABLE 1

Test results of baselines and our system (Average Precision/Recall/F1 Scores ± standard deviation, %)

| Methods | Datasets | |
|---|---|---|
| | AnatEM | Mars |
| Wagstaff et al. (2018) | — | 94.5/77.7/85.3 |
| NCRF++ | 83.40 ± 0.34/76.96 ± 0.46/80.05 ± 0.12 | 91.28 ± 1.08/80.57 ± 0.55/85.59 ± 0.23 |
| FLAIR | 81.07 ± 0.29/75.28 ± 0.57/78.06 ± 0.39 | 90.67 ± 1.02/81.45 ± 1.41/85.81 ± 0.62 |
| Pooled FLAIR | 82.11 ± 0.50/77.55 ± 0.40/79.76 ± 0.34 | 87.79 ± 1.31/86.57 ± 1.10/87.17 ± 0.17 |
| Tuning Bio/SciBERT | 83.94 ± 0.40/83.12 ± 0.30/83.53 ± 0.32 | 90.93 ± 0.66/88.99 ± 1.61/89.95 ± 0.64 |
| EnRel-G (C) | 84.65 ± 0.67/83.69 ± 0.31/84.17 ± 0.41 | 91.21 ± 1.05/89.35 ± 1.76/90.27 ± 0.45 |
| EnRel-G (D) | 84.98 ± 0.83/83.50 ± 0.45/84.23 ± 0.54 | 92.66 ± 1.16/88.03 ± 1.46/90.29 ± 0.53 |
| EnRel-G (CD) | 84.86 ± 0.50/83.96 ± 0.32/84.41 ± 0.24 | 92.57 ± 1.00/88.65 ± 1.50/90.57 ± 0.47 |

It is shown that this system with both the global entity coreference and local dependency relations performs the best among all the systems. It improves the average F1 score by points (84.41% vs. 83.53%) compared to BioBERT on the AnatEM, and 0.62 points (90.57% vs. 89.95%) compared to SciBERT on the Mars. Further, both the coreference and dependency relations help to improve the NER performance. Specifically, this model with the coreference or dependency relation graph improves the F1 scores by 0.64 point or 0.7 point on the AnatEM dataset, and by 0.32 point or 0.34 point on the Mars dataset.

Learning Curves

Figure 6:
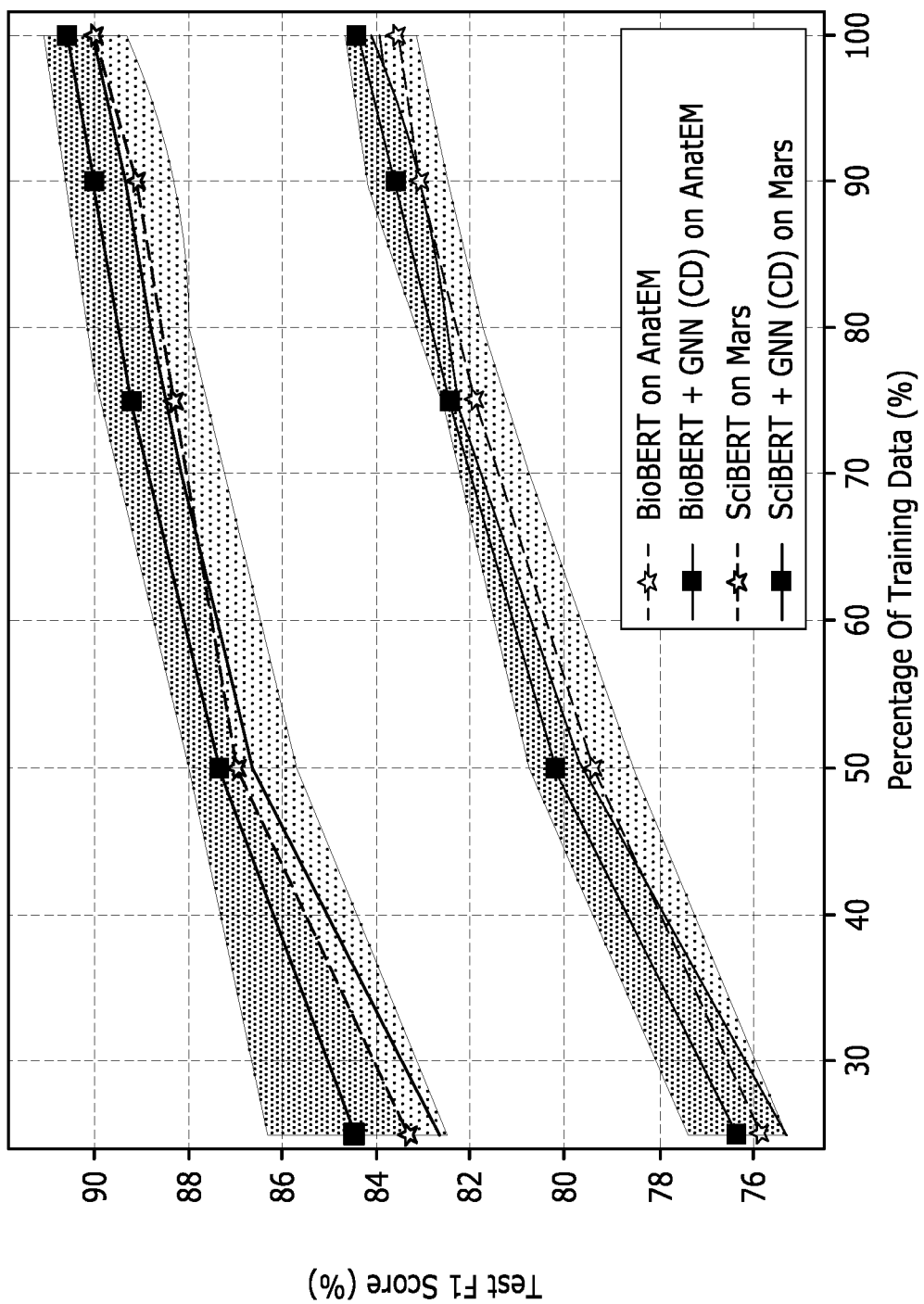
FIG. 6 is a graphical representation of Learning Curves, in which each point is the average performance of 5 system runs

One main limitation of domain-specific NER systems is the lack of annotations, so it is vital to make the best use of labeled data. The learning curves (FIG. 6) show that leveraging the relations between entity mentions can effectively elevate the NER performance to a higher level even when only a tiny amount of labeled data (a quarter of training data) is available, and this is true on both the AnatEM dataset and the Mars dataset.

Conclusion

This work explicitly captures the global coreference and local dependency relations between entity mentions, and the use graph neural nets to incorporate the relations improves domain-specific NER tasks. Experimental results on two datasets show the effectiveness of this lightweight approach.

It should be understood that the terms "first," "second," "third," and the like are not intended to be directly sequential with nothing in between, unless otherwise stated. A "first"

input is not necessarily the very first input received by the user, but is merely an input that is different than a "second" input. Likewise, a "second" input does not necessarily have to be an input that is received directly after the first input (there may be other inputs between the first and second inputs), but is simply a term to distinguish the second input form the first input.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method of operating a dialogue system, the computer-implemented method comprising:
    at a chatbot, receiving an input;
    transferring the input to a dialogue computer via a communication network, wherein the dialogue computer has a processor; and
    at the processor:
        identifying a plurality of candidate entities corresponding to the input;
        assigning word embeddings to the input at an embedding layer;
        capturing sequential context of the word embeddings in an encoding layer to obtain encoded word embeddings;
        constructing an entity relation graph using global coreference relations and local dependency relations to obtain a coreference graph and a dependency graph;
        executing a graphical neural network (GNN) to fuse the encoded word embeddings, coreference graph, and dependency graph to obtain updated word embeddings;
        decoding the updated word embeddings via a decoding layer to obtain enriched entity predictions; and
        operating the dialogue system based on the enriched entity predictions.

2. The computer-implemented method of claim 1, wherein the coreference relation includes an Exact Match, a Lemma Match, and an Acronym Match.

3. The computer-implemented method of claim 1, wherein the dependency relation includes a subject head word, an object head word, a subject head word predicate, and object head word predicate.

4. The computer-implemented method of claim 2, wherein the dependency relation includes a compound and head word.

5. The computer-implemented method of claim 1, wherein the encoding layer includes concatenated forward and backward Long Short-Term Memory (LSTM) hidden states.

6. The computer-implemented method of claim 1, wherein the decoding layer is a Conditional Random Field (CRF) layer.

7. The computer-implemented method of claim 6, further comprising:
    at the chatbot, querying a user of the chatbot based upon the enriched entity predictions of the input.

8. The method of claim 1, wherein the global coreference relations are document-level global conference relations, and the local dependency relations are sentence-level local dependency relations.

9. A system for operating a chatbot in a dialogue setting, the system comprising:
    a human-machine interface (HMI) configured to receive input from a user and provide output to the user;
    one or more storage devices; and
    one or more processors in communication with the HMI and the one or more storage devices, the one or more processors programmed to:
        at a chatbot, receive an input;
        transfer the input to a dialogue computer via a communication network, wherein the dialogue computer includes one or more of the processors;
        identify a plurality of candidate entities corresponding to the input;
        assign word embeddings to the input at an embedding layer;
        capture sequential context of the word embeddings in an encoding layer to obtain encoded word embeddings;
        construct an entity relation graph using global coreference relations and local dependency relations to obtain a coreference graph and a dependency graph;
        execute a graphical neural network (GNN) to fuse the encoded word embeddings, coreference graph, and dependency graph to obtain updated word embeddings;
        decode the updated word embeddings via a decoding layer to obtain enriched entity predictions; and operate the dialogue system based on the enriched entity predictions.

10. The system of claim 9, wherein the coreference relation includes an Exact Match, a Lemma Match, and an Acronym Match.

11. The system of claim 9, wherein the dependency relation includes a subject head word, an object head word, a subject head word predicate, and object head word predicate.

12. The system of claim 11, wherein the dependency relation includes a compound and head word.

13. The system of claim 9, wherein the encoding layer includes concatenated forward and backward Long Short-Term Memory (LSTM) hidden states.

14. The system of claim 9, wherein the decoding layer is a Conditional Random Field (CRF) layer.

15. The system of claim 9, wherein the one or more processors are further programmed to, at the chatbot, query a user of the chatbot based upon the enriched entity predictions of the input.

16. A computer-implemented method of Named Entity Recognition (NER) comprising:
    receiving an input;
    transferring the input to a dialogue computer via a communication network, wherein the dialogue computer has a processor;
    at the processor:
        identifying a plurality of candidate entities corresponding to the input;
        assigning word embeddings to the input at an embedding layer;
        capturing sequential context of the word embeddings in an encoding layer to obtain encoded word embeddings;
        constructing an entity relation graph using global coreference relations and local dependency relations to obtain a coreference graph and a dependency graph;
        executing a graphical neural network (GNN) to fuse the encoded word embeddings, coreference graph, and dependency graph to obtain updated word embeddings; and
        decoding the updated word embeddings via a decoding layer to obtain enriched entity predictions.

17. The computer-implemented method of claim 16, wherein the coreference relation includes an Exact Match, a Lemma Match, and an Acronym Match.

18. The computer-implemented method of claim 16, wherein the dependency relation includes a subject head word, an object head word, a subject head word predicate, object head word predicate, and a compound and head word.

19. The computer-implemented method of claim 16, wherein the decoding layer is a Conditional Random Field (CRF) layer.

20. The computer-implemented method of claim 16, wherein the global coreference relations are document-level global conference relations, and the local dependency relations are sentence-level local dependency relations.

* * * * *